(12) United States Patent
Yamauchi (10) Patent No.: US 12,461,225 B2
(45) Date of Patent: Nov. 4, 2025

(54) OBJECT DETECTION DEVICE AND OBJECT DETECTION METHOD

(71) Applicant: DENSO CORPORATION, Kariya (JP)

(72) Inventor: Takuma Yamauchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 359 days.

(21) Appl. No.: 18/167,714

(22) Filed: Feb. 10, 2023

(65) Prior Publication Data

US 2023/0184920 A1 Jun. 15, 2023

Related U.S. Application Data

(63) Continuation of application No. PCT/JP2021/026778, filed on Jul. 16, 2021.

(30) Foreign Application Priority Data

Aug. 11, 2020 (JP) ................. 2020-135603

(51) Int. Cl.
*G01S 13/60* (2006.01)
*G01S 13/86* (2006.01)
*G01S 13/931* (2020.01)

(52) U.S. Cl.
CPC ............ *G01S 13/60* (2013.01); *G01S 13/865* (2013.01); *G01S 13/867* (2013.01); *G01S 13/931* (2013.01); *G01S 2013/932* (2020.01)

(58) Field of Classification Search
None
See application file for complete search history.

(56) References Cited

U.S. PATENT DOCUMENTS

| | | | | |
|---|---|---|---|---|
| 4,021,801 A | * | 5/1977 | Chernick | F41G 7/2246 708/3 |
| 4,128,837 A | * | 12/1978 | Page | G01S 13/66 342/67 |
| 4,241,889 A | * | 12/1980 | Schwellinger | F41G 7/2246 342/17 |
| 5,005,425 A | * | 4/1991 | Ohmae | G01F 1/3282 73/861.23 |
| 7,188,801 B1 | * | 3/2007 | Jones | F41G 7/2246 244/3.15 |
| 2005/0286666 A1 | * | 12/2005 | Ryu | H04B 7/002 375/350 |
| 2015/0346332 A1 | * | 12/2015 | Taylor, Jr. | G01S 13/84 342/458 |
| 2017/0350971 A1 | * | 12/2017 | Winstead | G01S 7/354 |
| 2019/0061751 A1 | | 2/2019 | Baba et al. | |
| 2021/0101604 A1 | | 4/2021 | Sato | |

* cited by examiner

*Primary Examiner* — Bernarr E Gregory
(74) *Attorney, Agent, or Firm* — Maschoff Brennan (57) ABSTRACT

An object detection device is provided. The object detection device includes an acquisition unit that uses a detection result concerning a target object to acquire an attitude and a velocity of the target object, and a filter processing unit that sets a filter applied to the velocity depending on the acquired attitude of the target object to perform filter processing.

6 Claims, 5 Drawing Sheets

OBJECT DETECTION DEVICE AND OBJECT DETECTION METHOD

CROSS-REFERENCE OF RELATED APPLICATIONS

The present application is based on and claims the benefit of priority from earlier Japanese Patent Application No. 2020-135603 filed on Aug. 11, 2020, the description of which is incorporated herein by reference.

BACKGROUND

Technical Field

The present disclosure relates to a technique for detecting an object and is used for a vehicle.

Related Art

A technique is known which detects a velocity of a target object to correct the velocity by using motion of an own vehicle, for example, a yaw rate.

SUMMARY

An aspect of the present disclosure provides an object detection device. The object detection device includes an acquisition unit that uses a detection result concerning a target object to acquire an attitude and a velocity of the target object; and a filter processing unit that sets a filter applied to the velocity depending on the acquired attitude of the target object to perform filter processing.

DETAILED DESCRIPTION OF THE PREFERRED EMBODIMENTS

A technique is known which detects a velocity of a target object to correct the velocity by using motion of an own vehicle, for example, a yaw rate. (e.g., JP-A-2017-162005).

However, detectors typically have individual differences, and detection errors due to disturbance may occur depending on the detection environment. Hence, there is room for improving accuracy in detection.

Therefore, it is required to suppress or eliminate influences of individual differences of detectors and environmental disturbance, to improve accuracy in detecting a target object.

Embodiments of an object detection device and an object detection method according to the present disclosure will be described below.

First Embodiment

Figure 1:
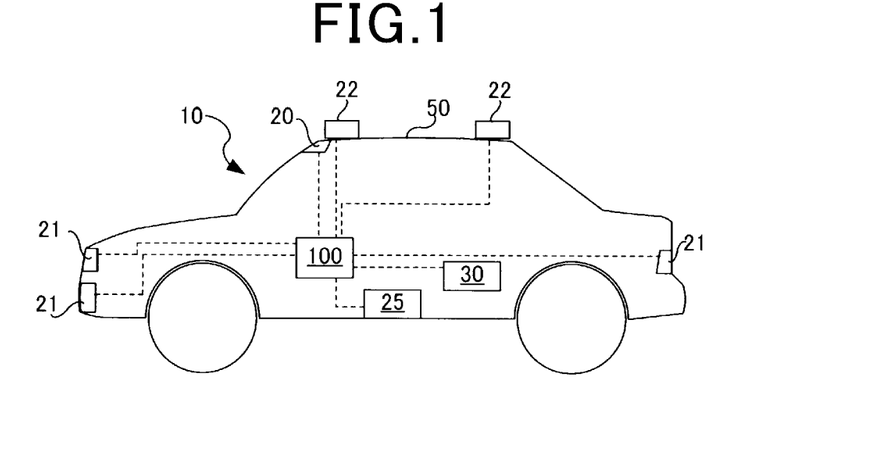
FIG. 1 is an explanatory diagram illustrating an example of a vehicle to which an object detection device is mounted according to a first embodiment.

As illustrated in FIG. 1, an object detection device 100 according to the first embodiment is used in a state of being mounted to a vehicle 50. The object detection device 100 may be used in a state of being mounted to, instead of the vehicle 50, a two-wheel vehicle or another movable body. The object detection device 100 according to the first embodiment configures an object detection system 10 together with a camera 20, a millimeter-wave radar 21, and a Lidar (Light Detection and Ranging) 22. The camera 20 is an imaging device including an imaging element such as a CCD or an imaging element array and is a detector that receives visible light and outputs information on an outline or information on a shape of an object as image data, which is a detection result. The camera 20 may be disposed on a front or rear window of the vehicle 50 or a side body of the vehicle 50. The millimeter-wave radar 21 is a detector that radiates millimeter waves and receives reflected waves from a target to detect a distance, an angle, and a velocity of the target with respect to the object detection device 100, that is, the vehicle 50. The reflected waves from the target are detected as a detection point group corresponding to the target. The millimeter-wave radar 21 may be disposed on a front or rear bumper, a front or rear grille, or a front or rear window of the vehicle 50. The Lidar 22 is a detector that radiates infrared laser light and receives reflected light from the target to detect a distance, an angle, and a velocity of the target with respect to the object detection device 100, that is, the vehicle 50. The reflected waves from the target are detected as a detection point group corresponding to the target. The Lidar 22 may be disposed on a roof, a front or rear bumper, a front or rear grille, or a front or rear window of the vehicle 50. The camera 20, the millimeter-wave radar 21, and the Lidar 22 may be collectively referred to as detectors for detecting environmental information around the vehicle 50. Although positions at which the detectors are disposed are exemplified, the detectors 20, 21, 22 may be disposed at various other positions of the vehicle 50.

The vehicle 50 further includes a yaw rate sensor 25 for detecting an attitude of the vehicle 50, more specifically, a yaw rate, which is an angular velocity when the vehicle 50 turns right or left. In addition, the vehicle 50 includes a vehicle control unit 30 for controlling a drive assist control unit that uses information on target objects around the vehicle 50 received from the detectors 20, 21, 22 to perform drive assist such as braking assist, steering assist, and drive assist.

Figure 2:
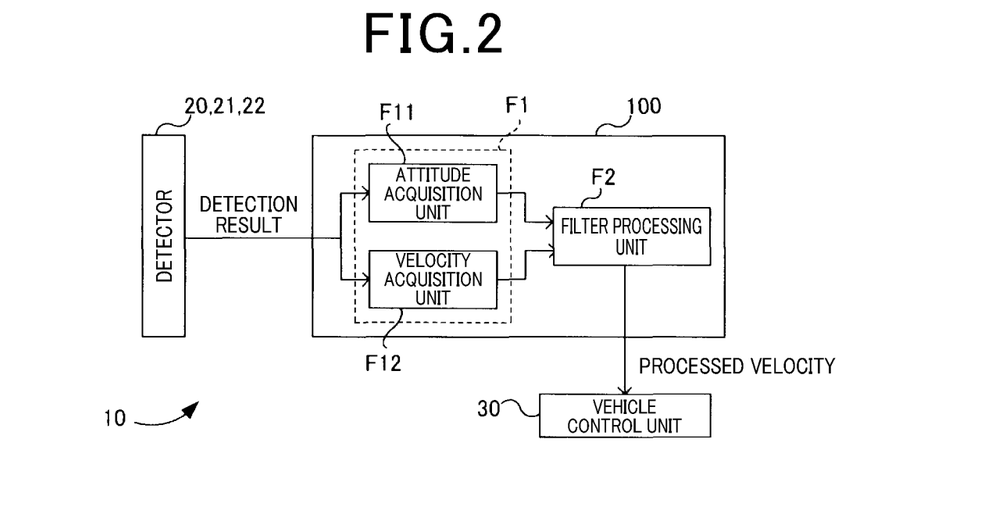
FIG. 2 is an explanatory diagram illustrating a functional configuration of the object detection device according to the first embodiment.

The object detection device 100 according to the first embodiment includes, as a functional configuration, a configuration illustrated in FIG. 2. The object detection device 100 includes an acquisition unit F1 and a filter processing unit F2. The acquisition unit F1 uses detection results of a target object received from the detectors 20, 21, 22 to acquire an attitude and a velocity of the target object. The attitude of the target object indicates a position and an orientation of the target object with respect the object detection device 100 and means, specifically, a direction in which the target object mainly travels, typically, an azimuth of a main direction, which is a longitudinal direction. More specifically, the acquisition unit F1 may include an attitude acquisition unit F11 that acquires an attitude of the target object and a velocity acquisition unit F12 that acquires a velocity of the target object. That is, the attitude and the velocity of the target object may be acquired simultaneously or separately. The filter processing unit F2 sets a filter having characteristics to be applied to the acquired velocity to perform filter processing. The velocity that has been subjected to filter processing by the filter processing unit F2 is output to, for example, the vehicle control unit 30.

Figure 3:
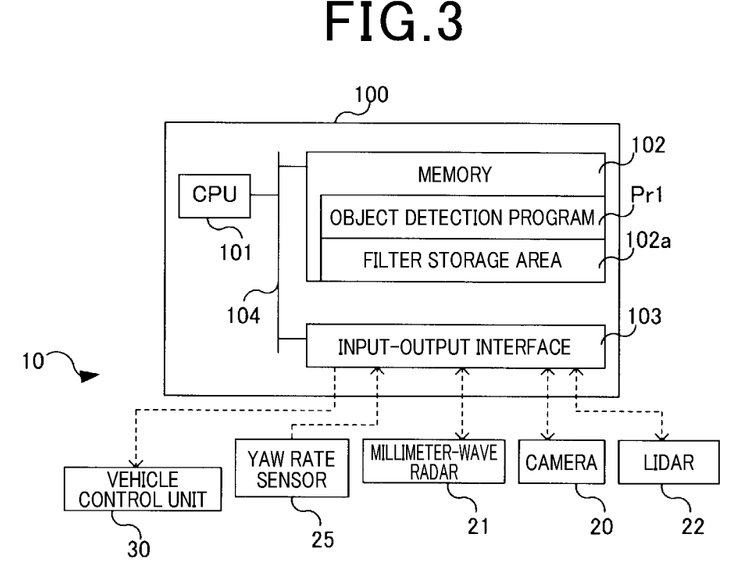
FIG. 3 is a block diagram illustrating an example of an internal configuration of the object detection device according to the first embodiment.

As illustrated in FIG. 3, the object detection device 100 includes a central processing unit (CPU) 101, a memory 102 as a storage unit, an input-output interface 103 as an acquisition unit, and a clock generator, which is not shown. The CPU 101, the memory 102, the input-output interface 103, and the clock generator are connected so as to be able to perform interactive communication via an internal bus 104. The memory 102 includes a nonvolatile read-only memory, for example, a ROM storing an object detection program Pr1 for setting a filter applied to a velocity of a target object depending on an attitude of the target object to detect the target object, and a memory readable and writable by the CPU 101, for example, a RAM. The nonvolatile read-only area of the memory 102 includes at least a filter storage area 102a storing a filter having a high/strong smoothing level and a filter having a low/weak smoothing level. The filter storage area 102a may further store a plurality of types of filters depending on target objects. The CPU 101, that is, the object detection device 100 loads the object detection program Pr1 stored in the memory 102 into the readable and writable memory, thereby functioning as the acquisition unit F1, the attitude acquisition unit F11, the velocity acquisition unit F12, and the filter processing unit F2. The CPU 101 may be a single CPU, a plurality of CPUs executing respective programs, or a multitasking type or multithreaded type CPU that can execute a plurality of programs simultaneously. The memory 102 may store, for example, a drive assist processing program that uses results of object detection to perform drive assist processing and autonomous drive processing.

The input-output interface 103 is connected with the camera 20, the millimeter-wave radar 21, and the Lidar 22, which are detectors that detects target objects, the yaw rate sensor 25, and the vehicle control unit 30. From the input-output interface 103 to the camera 20, an imaging control signal providing an instruction for performing imaging processing for object detection is transmitted. From the camera 20 to the input-output interface 103, an imaging signal indicating a captured image as a detection result is transmitted. From the input-output interface 103 to the millimeter-wave radar 21, a detection control signal indicating an instruction for transmission of detection waves for object detection and reception of incident waves is transmitted. From the millimeter-wave radar 21 to the input-output interface 103, a distance signal and an angle signal as a detection result or an incident wave intensity signal as raw data are transmitted. From the input-output interface 103 to the Lidar 22, a detection control signal providing an instruction for performing light emission/light reception processing for object detection is transmitted. From the Lidar 22 to the input-output interface 103, a distance signal and an angle signal as a detection result or an incident light intensity signal as raw data are transmitted. From the input-output interface 103 to the vehicle control unit 30, an object detection signal indicating a detection result of (concerning) an object is transmitted.

Figure 4:
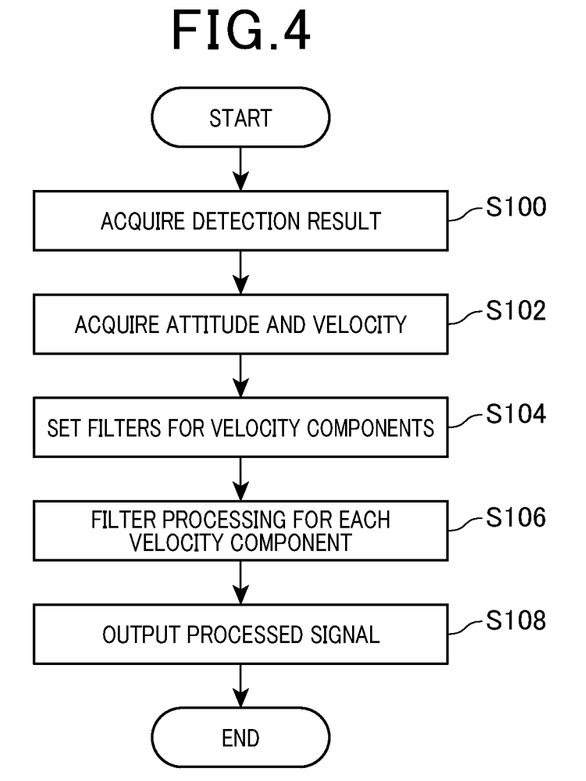
FIG. 4 is a flowchart of a process for object detection performed by the object detection device according to the first embodiment.
Figure 5:
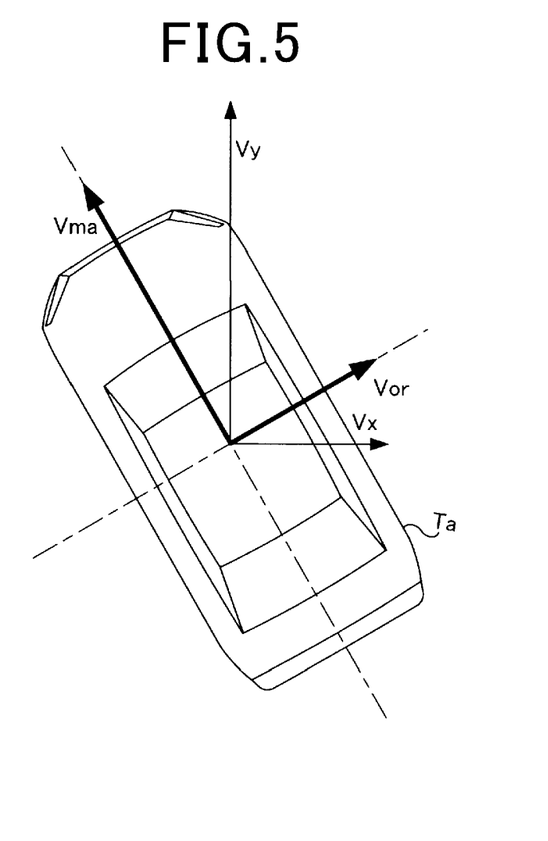
FIG. 5 is an explanatory diagram illustrating an example of an attitude of another vehicle, which is a target object, with respect to the vehicle to which the object detection device is mounted.

Referring to FIG. 4, an object detect process performed by the object detection device 100 according to the present embodiment will be described. After a control system of the vehicle 50 is started or after a start switch is turned on, the processing routine illustrated in FIG. 4 is repeatedly performed at predetermined time intervals, for example, several milliseconds. Executing the object detection program Pr1 by the CPU 101 executes the process shown in the flowchart illustrated in FIG. 4. Hereinafter, an example will be described in which the camera 20 and the millimeter-wave radar 21 are used as detectors. In the present embodiment, another vehicle is used as a target object Ta, which has an attitude illustrated in FIG. with respect to the vehicle 50 to which the object detection device is mounted. The target object Ta may include, in addition to another vehicle, movable bodies having a collision probability such as a bicycle, a motorcycle, a pedestrian, and an animal.

The CPU 101 acquires a detection result of (concerning) the target object Ta detected by the camera 20 and the millimeter-wave radar 21 via the input-output interface 103 (step S100). The detection result is information acquired by detecting the target object Ta by the detector, for example, a captured image indicating a shape and a position of the target object Ta in the case of the camera 20, and a group of detection points corresponding the target object Ta and information on distances and angles of the respective detection points in the case of the millimeter-wave radar 21. The target object Ta is recognized by performing pattern matching on captured images acquired by the camera 20, and is recognized by performing clustering processing by using the group of detection points acquired by the millimeter-wave radar 21.

The CPU 101 uses the acquired detection result to acquire an attitude and a velocity V of the target object Ta (step S102). The attitude of the target object Ta may be acquired as an angle of a main direction of the target object Ta with respect to the lateral direction of the vehicle 50 by using coordinate information of pixels corresponding to two or more feature points of the target object Ta recognized by the pattern matching, for example, two or more, preferably, three or more corners or four or more feature points to determine the main direction corresponding to the longitudinal direction of the target object Ta and an orthogonal direction orthogonal to the main direction. Alternately, the attitude of target object Ta may be acquired as an angle of the main direction of the target object Ta with respect to the lateral direction of the vehicle 50 by using coordinate information of a plurality of detection points corresponding to the target objects Ta recognized by the clustering processing of the group of detection points, for example, detection points corresponding to two or more, preferably, three or more corners or four or more detection points to determine the main direction corresponding to the longitudinal direction of the target object Ta and an orthogonal direction orthogonal to the main direction. The main direction of the target object Ta may be referred to as a movement direction, an orientation, or an azimuth of the target object Ta. When the target object Ta is a pedestrian, since the longitudinal direction cannot be easily determined, the face of the pedestrian may be discriminated to determine that the direction in which the face is oriented is the main direction. The attitude of target object Ta may be acquired by performing fusion processing by using a detection result of the camera 20 and the millimeter-wave radar 21, and using fusion establishment detection points at which the fusion processing has succeeded.

Figure 6:
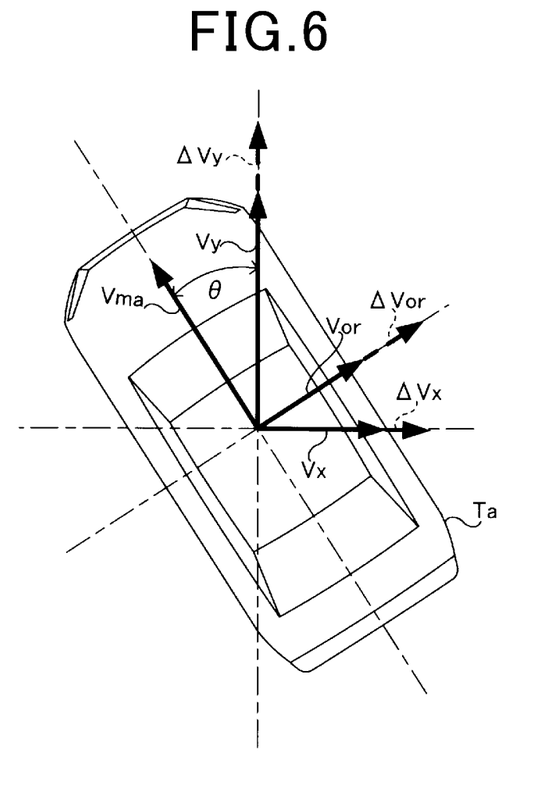
FIG. 6 is an explanatory diagram illustrating an acquired velocity of the target object by resolving the velocity into a main direction velocity component and an orthogonal direction velocity component.

As the velocity V of the target object Ta, a detection velocity, which is a velocity acquired by the millimeter-wave radar 21, may be used without change, or a history velocity, which is a velocity calculated by differentiating a movement history of the target object Ta, that is, a position history of the detection points with respect to time. Both of the detection velocity and the history velocity may be used. In this case, for example, a simple average value of both the velocities or a weighted average value obtained by weighting any one of the velocities may be used. As illustrated in FIG. 5, the acquired velocity V of the target object Ta is a velocity in a local coordinate system of the vehicle 50 and includes a traveling direction velocity component Vy and a lateral direction velocity component Vx orthogonal to the traveling direction. As illustrated in FIG. 6, according to the acquired attitude of the target object Ta, that is, the main direction and the orthogonal direction, the CPU 101 resolves the acquired velocity V, that is, the traveling direction velocity component Vy and the lateral direction velocity component Vx orthogonal to the traveling direction into a main direction velocity component Vma and an orthogonal direction velocity component Vor, which are velocity components of the target object Ta in the main direction and the orthogonal direction.

The CPU 101 sets filters applied to the velocity components Vma, Vor (step S104). As the filter, a low-pass filter for removing high-frequency components corresponding to noise components is used. For example, a moving average filter or a Butterworth low-pass filter may be used. Typically, the moving target object Ta undergoes large variation in the main direction and small variation in the orthogonal direction. That is, in a case in which the target object Ta is a vehicle, the velocity easily changes in the main direction due to braking or acceleration. Especially, the velocity changes greatly under sudden braking or sudden acceleration. Hence, since responsiveness is required of the main direction velocity component Vma, a filter having a low filter level, that is, a filter having a low smoothing level is suited. In contrast, in the orthogonal direction, since the velocity is difficult to change even under sudden braking and under sudden acceleration, the change in velocity is small. Hence, since stability rather than responsiveness is required of the orthogonal direction velocity component Vor, a filter having a high filter level, that is, a filter having a high smoothing level is suited. Hence, the CPU 101 sets a first filter having a low filter level for the main direction velocity component Vma, and sets a second filter having a filter level higher than that of the first filter for the orthogonal direction velocity component Vor. For example, the filter time constant of the first filter is lower than that of the second filter.

The CPU 101 uses the set first filter and second filter to perform filter processing for each velocity component (step S106). An example of a result of the filter processing for each velocity component is illustrated in FIG. 6. In FIG. 6, for simplicity, an example is illustrated in which the filter level of the first filter is sufficiently lower than the filter level of the second filter. Since no filter correction amount of the first filter is indicated, the main direction velocity component Vma does not change before and after the filter processing. In contrast, regarding the orthogonal direction velocity component Vor, a correction amount ΔVor acquired as a result of using the second filter is indicated by a broken line. When a rotation angle of the main direction of the target object Ta with respect to the traveling direction of the vehicle 50 is θ, if the traveling direction velocity component Vy and the lateral direction velocity component Vx are used, the main direction velocity component Vma, the orthogonal direction velocity component Vor, and the correction amount ΔVor are expressed by the following expressions. Vmaf and Vorf are the main direction velocity component Vma and the orthogonal direction velocity component Vor acquired as a result of the filter processing, and are processed velocity components.

$Vma = -Vx \sin θ + Vy \cos θ$ $Vmaf = Vma + ΔVma$ $Vor = Vx \cos θ + Vy \sin θ$ $Vorf = Vor + ΔVor$ It is noted that ΔVor>ΔVma or ΔVor/Vor>ΔVma/Vma. In the present embodiment, ΔVma=0. Hence, the correction amount for the processed main direction velocity component Vmaf is smaller than the correction amount for the processed orthogonal direction velocity component Vorf and indicates temporal and intensity changes equivalent to those of the main direction velocity component Vma. In contrast, since the orthogonal direction velocity component Vorf after processing has been more greatly corrected, the processed orthogonal direction velocity component Vorf indicates a gradual temporal change and a small intensity change with respect to the orthogonal direction velocity component Vor.

The CPU 101 outputs a processed signal including the processed main direction velocity component Vmaf and the processed orthogonal direction velocity component Vorf to, for example, the vehicle control unit 30 (step S108), and ends the present processing routine. More specifically, the CPU 101 converts the processed main direction velocity component Vmaf and the processed orthogonal direction velocity component Vorf into a local coordinate system of the object detection device 100, that is, a local coordinate system of the vehicle 50 and outputs the converted processed main direction velocity component Vmaf and orthogonal direction velocity component Vorf as a velocity signal including a processed traveling direction velocity component Vyf and a processed lateral direction velocity component Vxf. Specifically:

$Vxf = Vorf \cos θ - Vmaf \sin θ$ $= Vx + ΔVor \cos θ - ΔVmaf \sin θ$ $Vyf = Vorf \sin θ + Vmaf \cos θ$ $= Vy + ΔVor \sin θ + ΔVmaf \cos θ$ It is noted that, in the present embodiment, since ΔVmafsin θ=0, and ΔVmafcosθ=0, Vxf=Vx+ΔVorcosθ, and Vyf=Vy+ΔVorsin θ.

According to the object detection device 100 of the first embodiment described above, since a filter applied to a velocity of the target object Ta is set depending on an attitude of the target object Ta, even when a detector generates detection errors due to individual differences or detection errors due to disturbance of the detection environment, accuracy in detecting a velocity of the target object Ta can be improved. More specifically, in the object detection device 100 of the first embodiment, the first filter and the second filter having a filter level higher than that of the first filter are used. The first filter is set for the main direction velocity component Vma of the target object Ta, and the second filter is set for the orthogonal direction velocity component Vor. Hence, in the main direction in which a velocity is easily changed due to braking or acceleration, responsiveness is easily maintained, and large change in velocity is maintained under sudden braking or sudden acceleration. In the orthogonal direction in which a velocity is difficult to change even under sudden braking or sudden acceleration, small changes in velocity are smoothed, whereby stability is easily maintained. As a result, a variation in the orthogonal direction velocity component, which causes only small changes and is easily affected by individual differences and detection errors of a detector, is suppressed. A variation in the main direction velocity component, which changes greatly and is not easily affected by individual differences and detection errors of a detector, is maintained. As a result, accuracy in detecting a velocity of the target object Ta is improved.

Since accuracy in detecting a velocity of the target object Ta is improved, the vehicle control unit 30 can perform various types of drive assist control by using a received processed velocity, whereby accuracy in performing drive assist can be improved.

Second Embodiment

An object detection device according to the second embodiment differs from the object detection device 100 in that when a filter applied to a velocity of the target object Ta is set depending on an attitude of target object Ta, for a specific target object, the same filter, that is, a velocity component common filter is used instead of filters for respective velocity components. Hence, detailed descriptions of elements of the object detection device according to the following second embodiment will be omitted by using reference signs used in the first embodiment.

Figure 7:
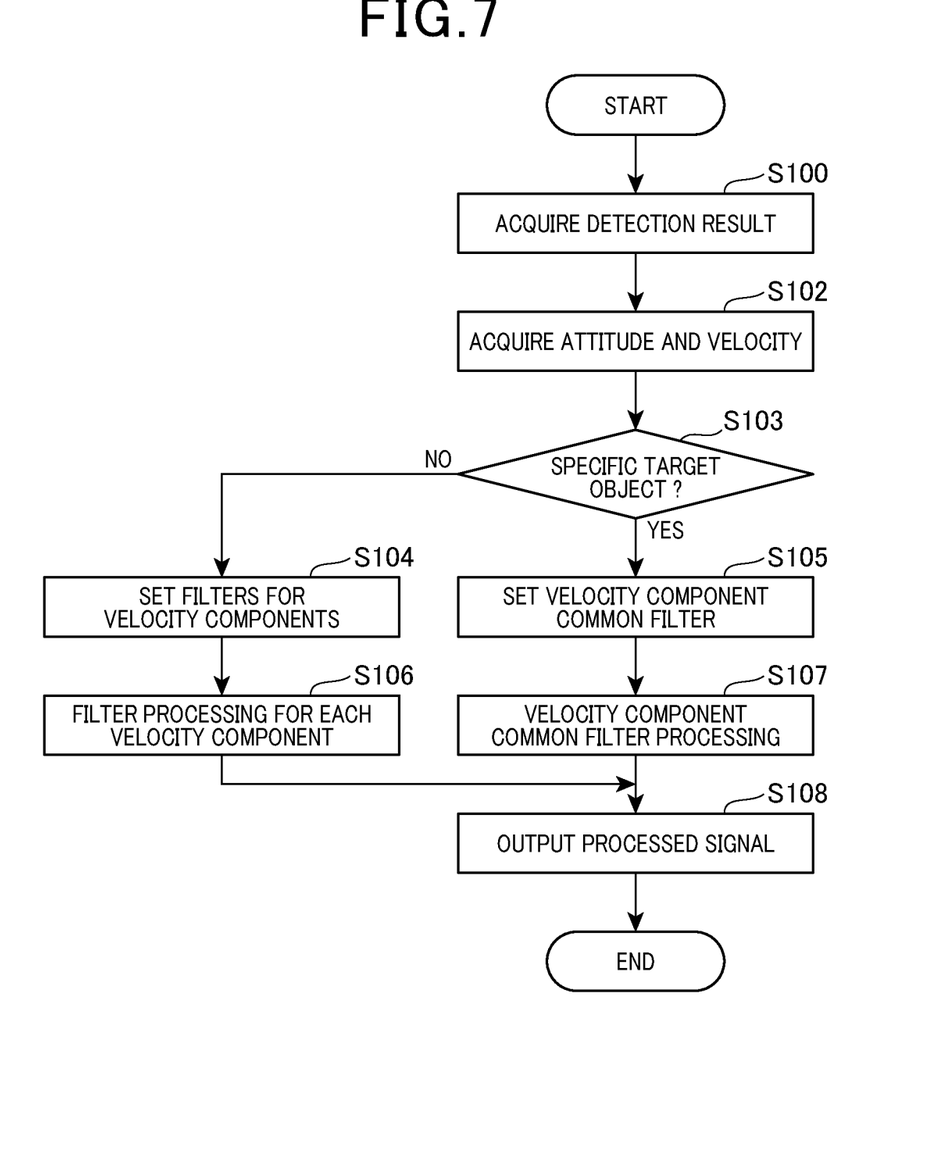
FIG. 7 is a flowchart of a process for object detection performed by an object detection device according to a second embodiment.

The object detection device 100 according to the second embodiment stores, for a specific target object, a program using a velocity component common filter as the object detection program Pr1 in the memory 102 instead of the filters for respective velocity components. An object detection process performed by the object detection device 100 according to the second embodiment will be described with reference to FIG. 7. After the control system of the vehicle 50 is started or after the start switch is turned on, the processing routine illustrated in FIG. 7 is repeatedly performed at predetermined time intervals, for example, several milliseconds. Executing the object detection program Pr1 by the CPU 101 executes the process shown in the flowchart illustrated in FIG. 7. Hereinafter, the same reference signs as those in the first embodiment are used for the processing steps equivalent to those performed by the object detection device 100 according to the first embodiment to omit detailed descriptions. Detectors and the attitude of the target object Ta subjected to filter processing for each velocity component are also equivalent to those of the first embodiment.

The CPU 101 acquires detection results of the target object Ta detected by the camera 20 and the millimeter-wave radar 21 via the input-output interface 103 (step S100). The CPU 101 uses the acquired detection results to acquire an attitude and the velocity V of the target object Ta (step S102). The CPU 101 determines whether the target object Ta is a predetermined specific target object, that is, a specific target object (step S103). The specific target object is a target object Ta that does not have a specific movement direction, that is, a specific main direction and a specific longitudinal direction, for example, a pedestrian. The determination of the specific target object may be performed by performing pattern matching using captured images acquired by the camera 20 and discrimination of a feature region such as a face region. Since pedestrians do not have a specific main direction and a specific longitudinal direction, accuracy in discriminating an attitude of a pedestrian is low, and the difference in velocities in the main direction and the longitudinal direction is small compared with a vehicle. Hence, technical significance of setting filters having different filter levels for respective velocity components is small, whereby it is desirable to reduce the time of filter processing for each velocity component.

If determining that the target object Ta is a specific target object (step S103: Yes), the CPU 101 sets a velocity component common filter (step S105). Considering a velocity of the specific target object, that is, a small movement amount, the velocity component common filter is a filter having a high filter level applied to the orthogonal direction velocity component Vor in the first embodiment. The CPU 101 uses the set velocity component common filter to perform the filter processing (step S107). Specifically, a filter having common characteristics for the main direction velocity component Vma and the orthogonal direction velocity component Vor is applied. As a result, correction amounts acquired as results of the filter processing are equal, or the ratio between correction amounts for the respective velocity component is constant.

If determining that the target object Ta is not a specific target object (step S103: No), the CPU 101 sets filters applied to the respective velocity components Vma, Vor (step S104) and performs filter processing for each velocity component by using the set first filter and second filter (step S106).

The CPU 101 outputs a processed signal including the processed main direction velocity component Vmaf and the processed orthogonal direction velocity component Vorf to, for example, the vehicle control unit 30 (step S108), and ends the present processing routine.

According to the object detection device 100 of the second embodiment described above, setting filters having an inappropriate filter level for the velocity components or applying a filter having a low filter level to a specific target object whose velocity variation is small, due to a low recognition level of the target object Ta, is suppressed or prevented. Hence, accuracy in detecting a velocity can be suppressed or prevented from lowering. In a case of a specific target object, without resolving the velocity V of the specific target object into the main direction velocity component Vma and the orthogonal direction velocity component Vor, one filter may be applied. In this case, filter processing is performed in the local coordinate system of the object detection device 100.

OTHER EMBODIMENTS (1) In the above embodiments, a filter applied to a velocity of the target object Ta is set depending on an attitude of the target object Ta. In addition, the filter level may be changed depending on type of the target object Ta. The filter level may be selected depending on the type of the target object Ta, for example, (Low filter level) vehicle motorcycle, bicycle<pedestrian (High filter level). Typically, small change of the position of a pedestrian frequently occurs compared with a vehicle, whereas movement velocity of the pedestrian is not high. Hence, applying a filter having a high filter level to remove noise components from motion of a pedestrian can improve accuracy in detecting principal movement characteristics of the pedestrian.

(2) In the above embodiments, filters applied to resolved velocity components of the target object Ta are set depending on an attitude of the target object Ta. However, a filter applied to a velocity of the target object Ta may be set depending on an attitude of the target object Ta. That is, filters having the same filter level may be applied to the main direction velocity component Vma and the orthogonal direction velocity component Vor. For example, if an angle of the main direction of the target object Ta with respect to the traveling direction of the vehicle 50 is smaller than a predetermined threshold value, that is, if the degree of movement of the target object Ta is dominant in the traveling direction of the vehicle 50, a filter having a low filter level may be set. If the degree of movement of the target object Ta is dominant in the lateral direction of the vehicle 50, a filter having a high filter level may be set. The reason is that if the target object Ta is moving mainly in the traveling direction of the vehicle 50, since a probability of contact with the vehicle 50 is high, high responsiveness is required, whereas if the target object Ta is moving mainly in the lateral direction of the vehicle 50, since a probability of contact with the vehicle 50 is low, low responsiveness is desired to prevent an erroneous determination.

(3) In the above embodiments, an example has been described in which, as detectors, the camera 20, the millimeter-wave radar 21, and the Lidar are mounted to the vehicle 50. However, detectors mounted to another vehicle, which is the target object Ta, may be used. In this case, detection results of the detectors mounted to another vehicle can be received via inter-vehicle communication or road-to-vehicle communication, and movement characteristics such as a velocity and an attitude of another vehicle can be acquired by using the received detection results. The detectors mounted to another vehicle may also have individual differences and cause detection errors. Detection errors due to communication delay may also occur. In contrast, when filter processing of the above embodiments is performed, individual differences and detection errors can be reduced or removed.

(4) In the above embodiments, the orientation of the own vehicle may be corrected by using output results of the yaw rate sensor 25 to correct a positional relation (attitude) with the target object Ta. In this case, accuracy in detecting a velocity of the target object Ta can be further improved.

(5) In the above embodiments, the object detection device is implemented in which the CPU 101 executes the object detection program Pr1 to set a filter applied to a velocity depending on an attitude of the vehicle 50 and performs filter processing. However, the object detection device 100 may be implemented with hardware by using a previously programmed integrated circuit or discrete circuits. That is, the control unit and the method executed by the control unit in the above embodiments may be implemented by a dedicated computer including a processor or a memory programmed to execute one or more functions embodied by computer programs. Alternatively, the control unit and the method executed by the control unit described in the present disclosure may be implemented by a dedicated computer including a processor formed of one or more dedicated hardware logical circuits. The control unit and the method executed by the control unit described in the present disclosure may be implemented by one or more dedicated computers including a combination of a processor and a memory programmed to execute one or more functions and a processor including one or more hardware logical circuits. The computer programs may be stored, as instructions to be executed by a computer, in a computer-readable non-transitory tangible storage medium.

The present disclosure has been described based on the embodiments and modifications. However, the embodiments and modifications are described for facilitating understanding the present disclosure and do not limit the present disclosure. The present disclosure may be modified without deviating from the spirit thereof and the claims and includes equivalents thereof. For example, technical features in the embodiments and modifications can be appropriately replaced or combined with each other in order to solve all or part of the objects described above or to achieve all or part of the effects described above. Some of the technical features can be appropriately deleted if they are not described as essentials herein.

The present disclosure can be implemented as the following aspects.

A first aspect of the present disclosure provides an object detection device (100). The object detection device includes an acquisition unit (F1) that uses a detection result concerning a target object to acquire an attitude and a velocity of the target object; and a filter processing unit (F2) that sets a filter applied to the velocity depending on the acquired attitude of the target object to perform filter processing.

According to the object detection device of the first aspect, influences of individual differences of detectors and environmental disturbance can be suppressed or eliminated to improve accuracy in detecting a target object.

A second aspect of the present disclosure provides an object detection method. The object detection method includes: using a detection result concerning a target object to acquire an attitude and a velocity of the target object; and setting a filter applied to the velocity depending on the acquired attitude of the target object to perform filter processing.

According to the object detection method of the second aspect, influences of individual differences of detectors and environmental disturbance can be suppressed or eliminated to improve accuracy in detecting a target object. The present disclosure can also be implemented as a control program for an object detection device or a computer-readable storage medium that stores the program.

What is claimed is:

1. An object detection device, comprising:
  memory having instructions stored thereon; and
  one or more processors configured to, based on the instructions stored on the memory, cause performance of operations, the operations comprising:
    using a detection result concerning a target object around a vehicle to acquire an attitude and a velocity of the target object; and
    resolving, depending on the acquired attitude of the target object, the acquired velocity into a main direction velocity component corresponding to a main direction of the target object and an orthogonal direction velocity component corresponding to an orthogonal direction orthogonal to the main direction;
  setting a smoothing level for a filter applied to each of the resolved main direction velocity component and orthogonal direction velocity component; and
    performing filter processing, using the filter, of the main direction velocity component and the orthogonal direction velocity component.

2. The object detection device according to claim 1, wherein the operations further comprise setting a first smoothing level for a first filter for the main direction velocity component and setting a second smoothing level for a second filter for the orthogonal direction velocity component the second smoothing level for the second filter providing more filtering than the first smoothing level for the first filter.

3. The object detection device according to claim 2, wherein
the operations further comprise converting the main direction velocity component and the orthogonal direction velocity component, which have been subjected to the filter processing, into a coordinate system of the object detection device; and
outputting the converted components.

4. The object detection device according to claim 2, wherein
when the target object is a predetermined specific target object, the operations further comprise selecting, as the filter, a common filter to perform the filter processing.

5. The object detection device according to claim 1, wherein
the operations further comprise selecting between different filters depending on a type of the target object.

6. An object detection method, comprising:
acquiring movement characteristics of a target object;
using the acquired movement characteristics to acquire an attitude and a velocity of the target object;
resolving, depending on the acquired attitude of the target object, the acquired velocity into a main direction velocity component corresponding to a main direction of the target object and an orthogonal direction velocity component corresponding to an orthogonal direction orthogonal to the main direction;
setting a smoothing level of a filter applied to each of the resolved main direction velocity component and orthogonal direction velocity component; and
filter processing, using the filter, of the main direction velocity component and the orthogonal direction velocity component.

* * * * *